(12) United States Patent
Potter et al.

(10) Patent No.: US 7,872,839 B2
(45) Date of Patent: Jan. 18, 2011

(54) SYSTEMS, METHODS, AND DEVICES FOR CONTROLLING A SERIAL ARC FAULT IN AN ELECTRICAL CIRCUIT

(75) Inventors: Frederick J. Potter, Trumbauersville, PA (US); James Arnold Wright, Redmond, WA (US)

(73) Assignee: Astronics Advanced Electronic Systems Corp., Redmond, WA (US)

( * ) Notice: Subject to any disclaimer, the term of this patent is extended or adjusted under 35 U.S.C. 154(b) by 137 days.

(21) Appl. No.: 12/464,373

(22) Filed: May 12, 2009

(65) Prior Publication Data

US 2010/0290162 A1    Nov. 18, 2010

(51) Int. Cl.
*H02H 3/16* (2006.01)
(52) U.S. Cl. .......................................... 361/42; 361/44
(58) Field of Classification Search .............. 361/42–50
See application file for complete search history.

(56) References Cited

U.S. PATENT DOCUMENTS

| | | | |
|---|---|---|---|
| 6,137,665 A * | 10/2000 | Boudaud ...................... 361/63 |
| 6,927,579 B2 | 8/2005 | Blades | |
| 7,227,729 B2 | 6/2007 | Parker et al. | |
| 7,408,750 B2 | 8/2008 | Pellon et al. | |
| 2007/0133134 A1* | 6/2007 | Kilroy et al. .................... 361/5 |
| 2008/0158744 A1* | 7/2008 | Rivers et al. ................... 361/42 |

* cited by examiner

*Primary Examiner*—Danny Nguyen
(74) *Attorney, Agent, or Firm*—Wiggin and Dana LLP; Gregory S. Rosenblatt; Anthony P. Gangemi

(57) ABSTRACT

Methods, systems, and devices for controlling a serial arc fault in an electrical circuit are disclosed. In some embodiments, the methods include the following: a. measuring a current in the circuit; b. determining whether the current is below a predetermined value; c. if the current is below ten percent of the predetermined value, determining whether a countdown timer value indicated by a cell pointer value is equal to zero; d. if the countdown timer value is equal to zero, starting a countdown timer, advancing the cell pointer value by one, and restarting the method at step a.; e. if the countdown timer value is not equal to zero, determining whether the interruptions in the current are periodic; f. if the interruptions in the current are not periodic, checking whether an arc event countdown timer is running; and g. if the arc event countdown timer is running, tripping a circuit breaker.

20 Claims, 4 Drawing Sheets

SYSTEMS, METHODS, AND DEVICES FOR CONTROLLING A SERIAL ARC FAULT IN AN ELECTRICAL CIRCUIT

BACKGROUND

Serial arc faults are typically created by the connecting or disconnecting of circuit connectors under load, a wire being broken or cut while under load, or a loose connection. As a result, an arc can be drawn between both ends impacted portion of the circuit. Serial arc faults act in series to a load and thus reduce current flowing through a circuit due to the additional resistance. Serial arc faults typically do not draw enough amperes to trip a circuit breaker. As a result, significant damage can occur if the arc is sustained for a period of time. Known technology for controlling serial arc faults fails to effectively address the issues presented by serial arc faults.

SUMMARY

Generally, the disclosed subject matter relates to systems, methods, and devices for controlling a serial arc fault in an electrical circuit. The current flowing through the electrical circuit is measured in real-time and further analyzed to identify the occurrence of a serial arc fault in the circuit. Upon identification, a circuit breaker is tripped to terminate the flow of current through the circuit and thus terminate the serial arc fault.

As defined herein, a serial arc fault is defined by the occurrence of two arc events in a two second timeframe. An arc event is defined herein by the occurrence of ten interruptions of the current that last 200 µs in 100 ms. As defined herein, an interruption is a point where the current drops below ten percent of the average current of the circuit. In addition, to meet the definition of an arc event, the interruptions can not be periodic. Generally, periodic interruptions are those that happen or recur at regular intervals. As defined herein, the interruptions are considered periodic if they all last longer than twenty-five percent of the time between interruptions.

BRIEF DESCRIPTION OF THE DRAWINGS

The drawings show embodiments of the disclosed subject matter for the purpose of illustrating the invention. However, it should be understood that the present application is not limited to the precise arrangements and instrumentalities shown in the drawings, wherein.

DETAILED DESCRIPTION

Figure 1:
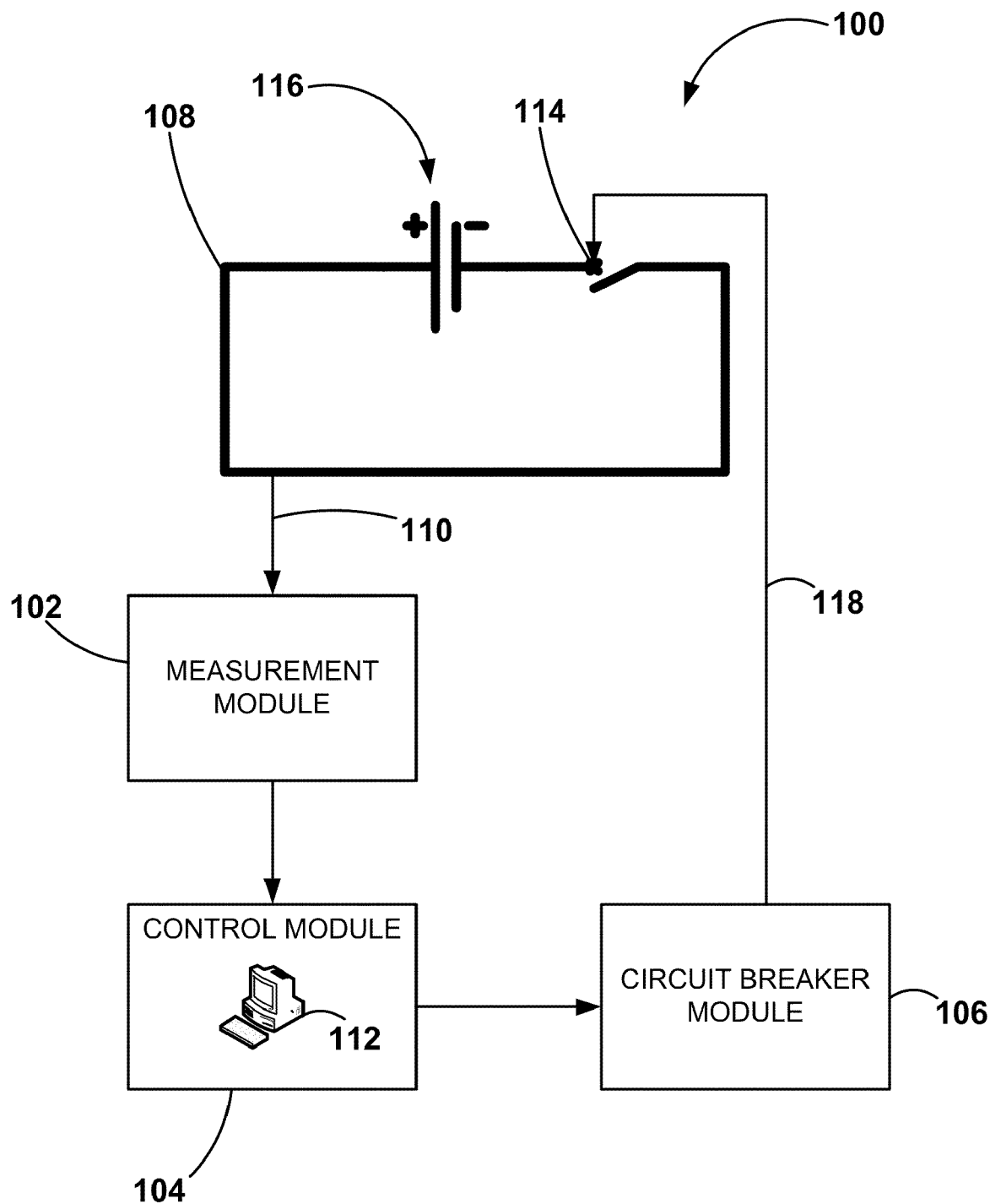
FIG. 1 is a diagram of a system and method according to some embodiments of the disclosed subject matter.
Figure 2:
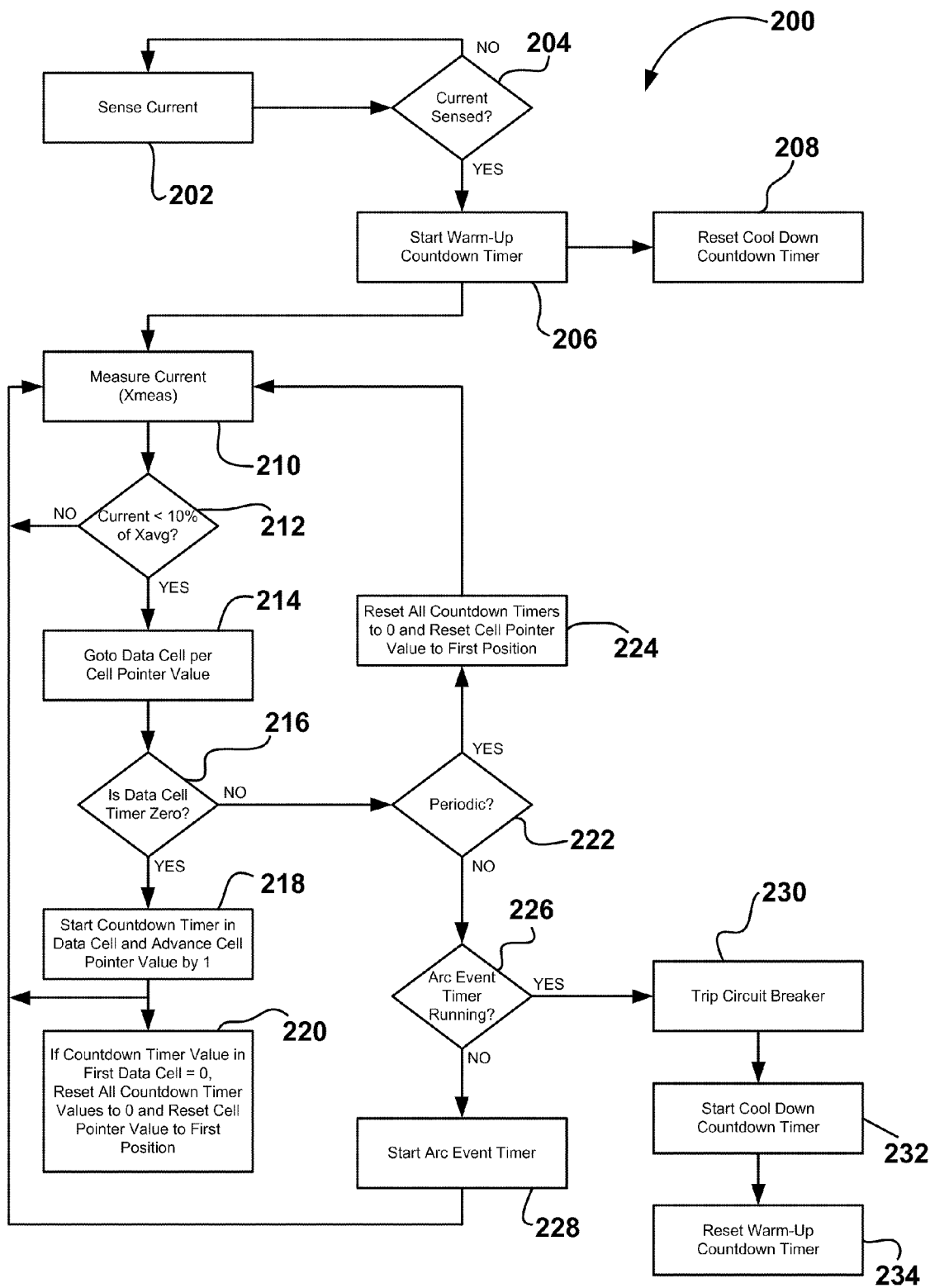
FIG. 2 is a chart of a method according to some embodiments of the disclosed subject matter.
Figure 3:
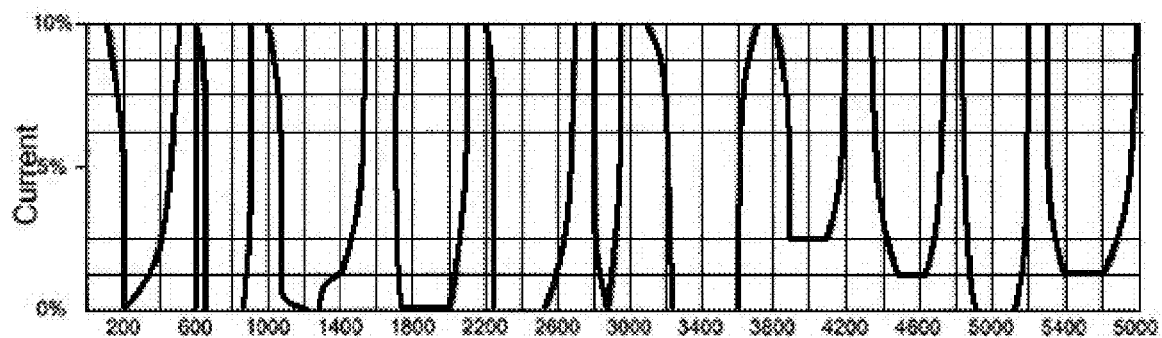
FIG. 3 is a chart including an example of current flowing with a periodic wave form.

Referring now to FIGS. 1-3, some embodiments include systems, methods, and devices for controlling a serial arc fault in an electrical circuit. Some embodiments include a system 100 having a measurement module 102, a control module 104, and a circuit breaker module 106, all of which are interconnected.

Measurement module 102 is in electrical communication with an electrical circuit 108. In some embodiments, measurement module 102 is integrated in electrical circuit 108 and in some embodiments the measurement module is joined with the electrical circuit via a lead 110. Measurement module 102 can be configured to both sense and measure current running through electrical circuit 108.

Control module 104 includes a processor and computer readable medium (not shown), which can be included in a computing device 112. The processor is configured to execute instructions contained on the computer readable medium. Generally, the instructions include continually measuring the current running through electrical circuit 108 and determining whether a serial arc fault has occurred.

Circuit breaker module 106 is joined with a circuit breaker 114 and is configured to adjustably control the flow of current through and a supply 116 of voltage across electrical circuit 108. In some embodiments, circuit breaker module 106 is integrated in electrical circuit 108 and in some embodiments the circuit breaker module is joined with the electrical circuit via a lead 118. When an occurrence of a serial arc fault in electrical circuit 108 is noted by control module 104, circuit breaker module 106 trips circuit breaker 114 to terminate the flow of current through and voltage from supply 116 across electrical circuit 108.

Referring now to FIG. 2, some embodiments of the disclosed subject matter include a method 200 of controlling a serial arc fault in an electrical circuit. At 202, the electrical circuit is measured to determine if any current is running through the circuit or a sensor detects a current running through the circuit. At 204, if no current is sensed, the method restarts at 202. If current is sensed, i.e., the current is greater than zero, then at 206, a warm-up countdown timer is started, and at 208, when the warm-up countdown timer is started, a cool down countdown timer is reset. The warm-up and cool down countdown timers are included to prevent nuisance tripping of the circuit breaker during times, which can occur at the start and end of periodic loads where the period expands or contracts quickly, thereby falsely presenting characteristics of non-periodic interruptions. The circuit breaker cannot be tripped while either the warm-up or cool down countdown timers are running.

After the warm-up countdown timer reaches zero, at 210, the current running through the electrical circuit is measured ("Xmeas"). At 212, it is determined whether Xmeas is below a predetermined amount of a predetermined average current ("Xavg") for the electrical circuit. In some embodiments, the predetermined amount is about ten percent. If Xmeas is not below Xavg by a predetermined amount, e.g., Xmeas is greater than ten percent of Xavg, method 200 restarts at 210 and the current running through the electrical circuit is re-measured. If Xmeas is below ten percent of Xavg for the electrical circuit, an interruption in the current noted and at 214 a countdown timer value in a data cell indicated by a cell pointer is reviewed. At 216, it is determined whether the countdown timer value is equal to zero. If the countdown timer value is equal to zero, at 218, a countdown timer is started in the data cell, the cell pointer value is advanced by one, and method 200 is restarted at 210 where the current running through the electrical circuit is re-measured. Typically, each countdown timer has a beginning value of 1000 units and each of the units is equal to 100 µs.

If at any time during method 200, the countdown timer value in a first data cell, i.e., the first countdown timer started, reaches zero before a predetermined number of data cells are populated with countdown value timers, at 220, all the countdown timer values in all the data cells are reset to zero, the cell pointer value is reset to a first position at the first data cell, and the method is restarted at 210. In some embodiments, the predetermined number of data cells is about ten.

Figure 4:
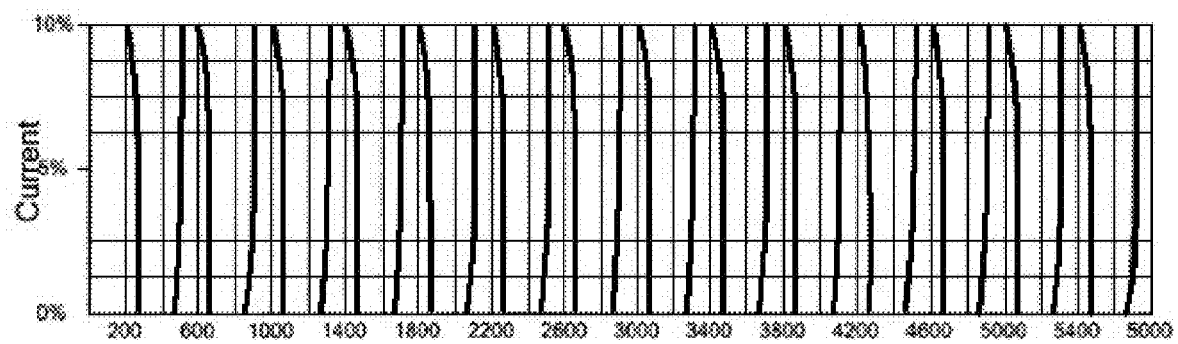
FIG. 4 is a chart including an example of current flowing with a non-periodic wave form.

At 222, if the countdown timer value is not equal to zero, it is determined whether the interruptions in the current are periodic. As discussed above and shown in FIGS. 3 and 4, a non-periodic wave form is one where all of the interruptions are do not last longer than twenty-five percent of the time between the interruptions and vice-versa for periodic wave forms. As explained further below, determining whether interruptions in the current are periodic includes first determining a difference between the countdown timer values of the last two of the predetermined number of data cells started. Then a threshold value is calculated by multiplying the difference by a predetermined value, e.g., twenty-five percent in some embodiments. Then the differences between adjacent ones of the countdown timer values of the remaining of the predetermined number of data cells started are calculated. The interruptions are not periodic if the differences are greater than the threshold value.

If the interruptions are periodic, at 224, all countdown timer values are reset to zero, the cell pointer value is reset to a first position at the first cell, and method 200 is restarted at 210. If the interruptions in the current are not periodic, at 226, the occurrence of an arc event in the electrical circuit is noted and it is determined whether an arc event countdown timer is running. Generally, an arc event is defined as the occurrence of ten (10) interruptions of current that last 200 μs in 100 ms. If the arc event countdown timer is not running, at 228, the arc event countdown timer having a predetermined beginning value is started and then method 200 is restarted at 210. In some embodiments, the predetermined beginning value is two seconds. At 230, if the arc event countdown timer is running, the occurrence of a serial arc fault in the electrical circuit is noted and a circuit breaker of the electrical circuit is tripped. Upon tripping the circuit breaker, at 232, the cool down countdown timer is started and at 234, the warm-up timer is reset.

Example

The following is an example of how one embodiment of method 200 is used to detect and control the occurrence of arc events and serial arc faults in an electrical circuit.

As discussed above and further illustrated in Tables 1-4 below, upon noting the occurrence of a first interruption in current, the value of countdown TIMER 1, which is positioned at a first data cell indicated by a cell pointer value V (in column 0), is set to 1000 units and pointer V is advanced to column 1. As mentioned above, each of the 1000 units is typically equal to 100 μs.

TABLE 1

| Pointer | V → | | | | | | | | | |
|---|---|---|---|---|---|---|---|---|---|---|
| Column | 0 | 1 | 2 | 3 | 4 | 5 | 6 | 7 | 8 | 9 |
| Data Cell | TIMER 1 | | | | | | | | | |
| Timer Value | 1000 | | | | | | | | | |
| Delta | | | | | | | | | | |

As shown in Table 2, on the next sensed interruption, for example, after 800 μs has elapsed, pointer V is at column one (1), the interruption is sensed, and the value of TIMER 2, which is positioned in a second data cell, is set to 1000 and pointer V is advanced to column 2.

TABLE 2

| Pointer | | V → | | | | | | | |
|---|---|---|---|---|---|---|---|---|---|
| Column | 0 | 1 | 2 | 3 | 4 | 5 | 6 | 7 | 8 | 9 |
| Data Cell | TIMER 1 | TIMER 2 | | | | | | | |
| Timer Value | 992 | 1000 | | | | | | | |
| Delta | 8 | | | | | | | | |

As shown in Table 3, on next sensed interruption, for example, after an additional 200 μs has elapsed, pointer V is at column two (2), the interruption is sensed, and the value of TIMER 3, which is positioned into a third data cell, is set to 1000 and pointer V is advanced to column 3.

TABLE 3

| Pointer | | | V → | | | | | | |
|---|---|---|---|---|---|---|---|---|---|
| Column | 0 | 1 | 2 | 3 | 4 | 5 | 6 | 7 | 8 | 9 |
| Data Cell | TIMER 1 | TIMER 2 | TIMER 3 | | | | | | |
| Timer Value | 990 | 998 | 1000 | | | | | | |
| Delta | 8 | 2 | | | | | | | |

Method 200 continues until 7 more interruptions are sensed or countdown TIMER 1 runs out, which would indicate that 100 ms has elapsed without detecting an arc event. If TIMER 1 runs to zero before ten interruptions are sensed, all of the TIMERS are cleared and method 200 restarts by measuring the current in the electrical circuit.

As shown in Table 4, in the case where ten interruptions are sensed within 100 ms, the TIMER values in all ten data cells are checked to determine whether the interruptions are periodic. The time between interruptions or the delta is calculated. If each is greater than twenty-five (25) percent of the last delta, e.g., 12 in the Table 4 example, it is not periodic and an arc event has occurred. As mentioned above, when an arc event is noted, the arc event countdown timer is checked. If the arc event countdown timer is running, that means that a second arc event has occurred within 2 seconds thereby indicating a serial arc fault. At that time, the circuit breaker is tripped. If the arc event countdown timer is not running, it is started and the current is measure per method 200. If a second table filled and not periodic within before the arc event countdown timer runs to zero, it is an indication of a second arc event and thus a serial arc fault.

TABLE 4

| Pointer | V | | | | | | | | | |
|---|---|---|---|---|---|---|---|---|---|---|
| Column | 0 | 1 | 2 | 3 | 4 | 5 | 6 | 7 | 8 | 9 |
| Data Cell | TIMER 1 | TIMER 2 | TIMER 3 | TIMER 4 | TIMER 5 | TIMER 6 | TIMER 7 | TIMER 8 | TIMER 9 | TIMER 10 |
| Timer Value | 540 | 548 | 550 | 600 | 800 | 810 | 820 | 900 | 950 | 990 |
| Delta (time between interruptions) | 8 | 2 | 50 | 200 | 10 | 10 | 80 | 50 | 50 | |

TABLE 4-continued

| Delta deltas (is it >25% of last delta, if yes, arc event is non-periodic) | 50 − 8 = 42<br>42<br>>12 | 50 − 2 = 48<br>48<br>>12 | 50 − 50 = 0<br>0<br><12 | 50 − 200 = 150<br>150<br>>12 | 50 − 10 = 40<br>40<br>>12 | 50 − 10 = 40<br>40<br>>12 | 50 − 80 = 30<br>30<br>>12 | 50 − 50 = 0<br>0<br><12 | 25% of last delta is 12 |
|---|---|---|---|---|---|---|---|---|---|

Figure 5:
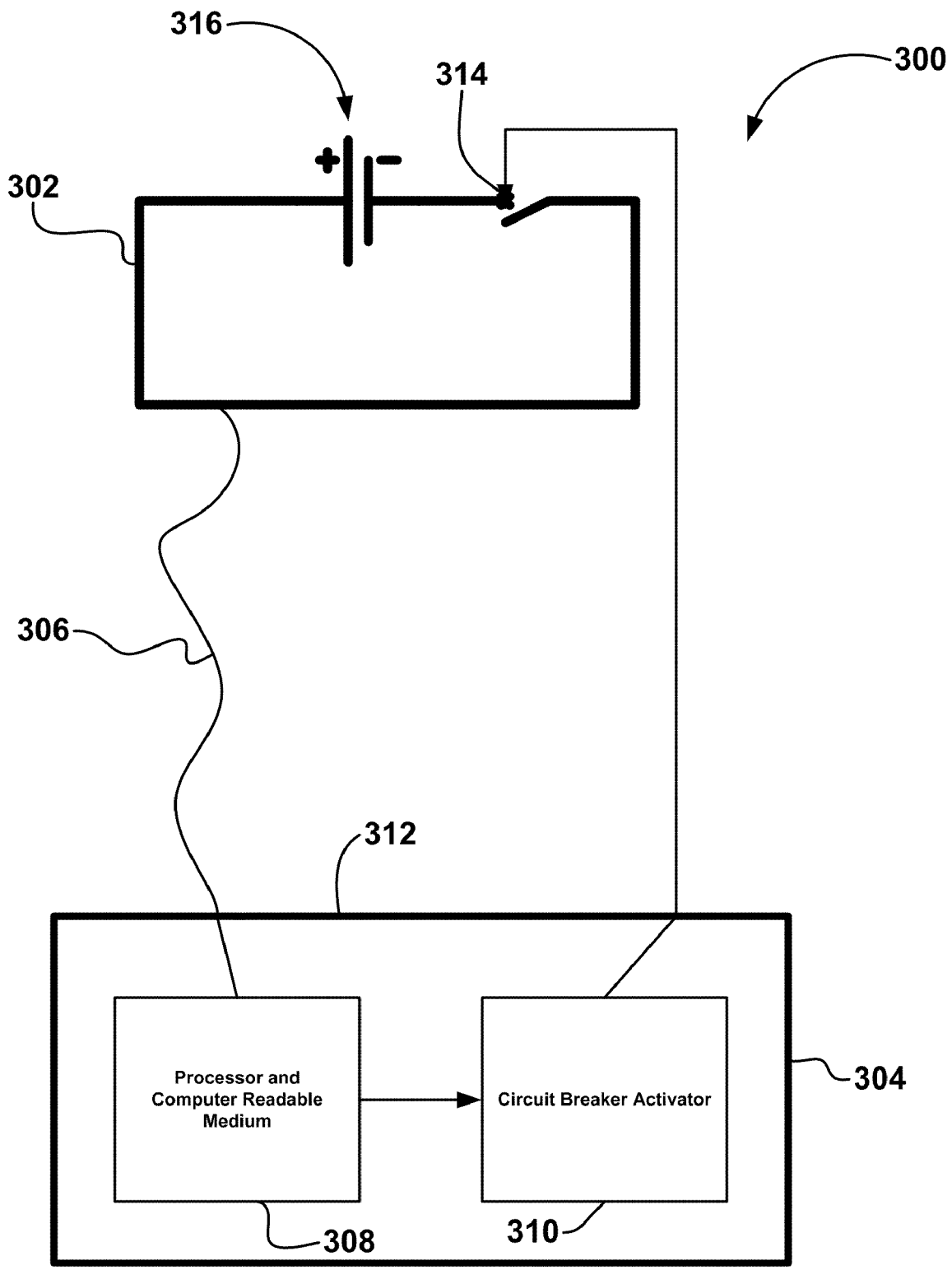
FIG. 5 is a diagram of a device according to some embodiments of the disclosed subject matter.

Referring now to FIG. 5, some embodiments of the disclosed subject matter include a device 300 for controlling a serial arc fault in an electrical circuit 302. Device 300 generally includes a housing 304, which at least partially contains a measurement/sensor lead 306, a processor and computer readable medium 308, and a circuit breaker activator 310.

Measurement/sensor lead 306 extends from an end 312 of housing 304. Measurement/sensor lead is used for sensing and measuring a current running through electrical circuit 302. Measurement/sensor lead 306 is typically adapted to be removably in electrical communication with electrical circuit 302.

Processor and computer readable medium 308 is positioned within housing 304 and is communication with measurement/sensor lead 306. The processor is generally configured to execute instructions contained on the computer readable medium. Generally, the instructions include continually measuring the current running through electrical circuit 302 and determining whether a serial arc fault has occurred.

Circuit breaker activator 310 is in communication with processor and computer readable medium 308 and a circuit breaker 314 for electrical circuit 302. Upon occurrence of a serial arc fault in electrical circuit 302 as indicated by processor and computer readable medium 308, circuit breaker activator 310 causes circuit breaker 314 of the electrical circuit to trip thereby discontinuing the flow of a current through and voltage from a power supply 316 across the electrical circuit.

Methods, systems, and devices according to the disclosed subject matter offer benefits and advantages over known technology. Using technology including the disclosed subject matter, serial arc faults are identified and terminated more rapidly, thus reducing the amount of damage caused by the faults.

Although the disclosed subject matter has been described and illustrated with respect to embodiments thereof, it should be understood by those skilled in the art that features of the disclosed embodiments can be combined, rearranged, etc., to produce additional embodiments within the scope of the invention, and that various other changes, omissions, and additions may be made therein and thereto, without parting from the spirit and scope of the present invention.

What is claimed is:

1. A method of controlling a serial arc fault in an electrical circuit, said method comprising:
   a. measuring a current running through said electrical circuit;
   b. determining whether said current is below a predetermined average current for said electrical circuit by a predetermined amount;
   c. if said current is below ten percent of said predetermined average current for said electrical circuit, noting an interruption in said current and determining whether a countdown timer value in a data cell indicated by a cell pointer value is equal to zero;
   d. if said countdown timer value is equal to zero, starting a countdown timer in said data cell, advancing said cell pointer value by one, and restarting said method at step a.;
   e. if said countdown timer value is not equal to zero, determining whether said interruptions in said current are periodic;
   f. if said interruptions in said current are not periodic, noting occurrence of an arc event in said electrical circuit and checking whether an arc event countdown timer is running; and
   g. if said arc event countdown timer is running, noting occurrence of a serial arc fault in said electrical circuit and tripping a circuit breaker of said electrical circuit.

2. A method according to claim 1, wherein said predetermined amount is about ten percent of said predetermined average current.

3. A method according to claim 1, wherein if said current is greater than ten percent of said predetermined average current, said method is restarted at step a.

4. A method according to claim 1, wherein said countdown timer has a beginning value of 1000 units, each of said units being equal to 100 μs.

5. A method according to claim 1, wherein if a countdown timer value in a first data cell reaches zero before a predetermined number of data cells are populated with countdown value timers, all the countdown timer values in all the data cells are reset to zero, said cell pointer value is reset to a first position at said first data cell, and said method is restarted at step a.

6. A method according to claim 5, wherein said predetermined number of data cells is about ten.

7. A method according to claim 1, wherein determining whether said interruptions in said current are periodic comprises:
   determining a difference between said countdown timer values of the last two of said predetermined number of data cells started;
   calculating a threshold value by multiplying said difference by a predetermined value; and
   determining differences between adjacent ones of said countdown timer values of the remaining of said predetermined number of data cells started;
   wherein said interruptions are not periodic if said differences are greater than said threshold value.

8. A method according to claim 1, wherein if said interruptions are periodic, all countdown timer values are reset to zero, said cell pointer value is reset to a first position at said first cell, and said method is restarted at step a.

9. A method according to claim 1, wherein if said current is greater than zero, a warm-up countdown timer is started.

10. A method according to claim 9, wherein when said warm-up countdown timer is started, a cool down countdown timer is reset.

11. A method according to claim 10, wherein when said circuit breaker is tripped, said cool down countdown timer is started and said warm-up timer is reset.

12. A method according to claim 1, wherein if said arc event countdown timer is not running, said arc event countdown timer having a predetermined beginning value is started.

13. A method according to claim 12, wherein said predetermined beginning value is two seconds.

14. A method according to claim 12, further comprising:
after starting said arc event countdown timer, restarting said method at step a.

15. A system for controlling a serial arc fault in an electrical circuit, said system comprising:
a measurement module for measuring a current running through said electrical circuit, said measurement module being in electrical communication with said electrical circuit;
a control module including a processor and computer readable medium, said processor being configured to execute instructions contained on said computer readable medium, said instructions including
  a. determining whether said current measured in said measurement module is below a predetermined average current for said electrical circuit by a predetermined amount;
  b. if said current is below ten percent of said predetermined average current for said electrical circuit, noting an interruption in said current and determining whether a countdown timer value in a data cell indicated by a cell pointer value is equal to zero;
  c. if said countdown timer value is equal to zero, starting a countdown timer in said data cell, advancing said cell pointer value by one, and measuring said current in said electrical circuit using said measurement module;
  d. if said countdown timer value is not equal to zero, determining whether said interruptions in said current are periodic;
  e. if said interruptions in said current are not periodic, noting occurrence of an arc event in said electrical circuit and checking whether an arc event countdown timer is running; and
  f. if said arc event countdown timer is running, noting occurrence of a serial arc fault in said electrical circuit; and
a circuit breaker module for tripping a circuit breaker of said electrical circuit upon noting an occurrence of a serial arc fault in said electrical circuit by said control module, said circuit breaker module being configured to adjustably control a flow of said current to said electrical circuit.

16. A system according to claim 15, wherein said predetermined amount is about ten percent of said predetermined average current.

17. A system according to claim 15, wherein said countdown timer has a beginning value of 1000 units, each of said units being equal to 100 μs.

18. A device for detecting a serial arc fault in an electrical circuit, said device comprising:
a housing;
a measurement lead extending from an end of said housing, said measurement lead being used for measuring a current running through said electrical circuit, said measurement lead adapted to be removably in electrical communication with said electrical circuit;
a processor and computer readable medium positioned within said housing and in communication with said measurement lead, said processor being configured to execute instructions contained on said computer readable medium, said instructions including
  a. determining whether said current measured by said measurement lead is below a predetermined average current for said electrical circuit by a predetermined amount;
  b. if said current is below ten percent of said predetermined average current for said electrical circuit, noting an interruption in said current and determining whether a countdown timer value in a data cell indicated by a cell pointer value is equal to zero;
  c. if said countdown timer value is equal to zero, starting a countdown timer in said data cell, advancing said cell pointer value by one, and measuring said current in said electrical circuit using said measurement module;
  d. if said countdown timer value is not equal to zero, determining whether said interruptions in said current are periodic;
  e. if said interruptions in said current are not periodic, noting occurrence of an arc event in said electrical circuit and checking whether an arc event countdown timer is running; and
  f. if said arc event countdown timer is running, noting occurrence of a serial arc fault in said electrical circuit; and
a circuit breaker activator in communication with said processor and a circuit breaker for said electrical circuit, wherein said circuit breaker activator trips said circuit breaker of said electrical circuit upon occurrence of a serial arc fault in said electrical circuit as indicated by said processor.

19. A system according to claim 18, wherein said predetermined amount is about ten percent of said predetermined average current.

20. A system according to claim 18, wherein said countdown timer has a beginning value of 1000 units, each of said units being equal to 100 μs.

* * * * *